(12) United States Patent
Chern

(10) Patent No.: US 7,317,110 B2
(45) Date of Patent: Jan. 8, 2008

(54) LOW DIELECTRIC CONSTANT ORGANO-SOLUBLE POLYIMIDES

(75) Inventor: Yaw-Terng Chern, Taipei (TW)

(73) Assignee: Home Sun Industrial Co., Ltd., Nan-Tou (TW)

( * ) Notice: Subject to any disclaimer, the term of this patent is extended or adjusted under 35 U.S.C. 154(b) by 293 days.

(21) Appl. No.: 11/049,654

(22) Filed: Feb. 4, 2005

(65) Prior Publication Data
US 2006/0178499 A1 Aug. 10, 2006

(51) Int. Cl.
C08G 69/08 (2006.01)
C07C 79/22 (2006.01)
C07D 209/48 (2006.01)

(52) U.S. Cl. ..................... 548/473; 568/707

(58) Field of Classification Search .............. 568/707; 548/473
See application file for complete search history.

(56) References Cited

U.S. PATENT DOCUMENTS 4,582,947 A * 4/1986 Stahly .................. 568/707
4,990,627 A * 2/1991 Robinson et al. ........... 548/473

FOREIGN PATENT DOCUMENTS

EP 1288191 * 3/2003

OTHER PUBLICATIONS

Wright et al Synthesis of 2,6 diakylphenyl . . . Journal of Org Chem vol. 33, No. 3, p. 1245-1246.*
"Macromolecules" ("Low Dielectric Polyimides Derived from Novel 1,6-Bis[4-(4-aminophenoxy)phenyl]diamantane"); Reprinted from vol. 31, No. 17, pp. 5837-5844: Yaw-Terng Chern, Institute of Chemical Engineering, National Taiwan University of Science and Technology, Taipei, Taiwan 106, Republic of China; 1998; 9 pages total.

"Macromolecules" ("Low Dielectric Constants of Soluble Polyimides Based on Adamantane"); Reprinted from vol. 30, No. 16, pp. 4646-4651: Yaw-Terng Chern and Hann-Chyan Shiue, Institute of Chemical Engineering, National Taiwan University of Science and Technology, Taipei, Taiwan 106, Republic of China; 1997; 7 pages total.

"Macromolecules" ("Low Dielectric Constants of Soluble Polyimides Derived from the Novel 4,9-Bis[4-(4aminophenoxy)phenyl]diamantine"); Reprinted from vol. 30, No. 19, pp. 5766-5772: Yaw-Terng Chern and Hann-Chyan Shiue, Institute of Chemical Engineering, National Taiwan University of Science and Technology, Taipei, Taiwan 106, Republic of China; 1997; 6 pages total.

"Polymer" ("Synthesis and characterization of new polyimides derived from 4,9-diaminodiamantane"); vol. 39, No. 25: Yaw-Terng Chern and Chih-Min Huang, Institute of Chemical Engineering, National Taiwan University of Science and Technology, Taipei, 106, Taiwan, ROC; 1998; pp. 6643-6648.

"Macromolecules" ("Low Dielectric Constants of Soluble Polyimides Derived from the Novel 4,9-Bis[4-(4aminophenoxy)phenyl]diamantine"): Yaw-Terng Chern and Hann-Chyan Shiue, Institute of Chemical Engineering, National Taiwan University of Science and Technology, Taipei, 106, Taiwan; 1998; pp. 963-969.

* cited by examiner

Primary Examiner—James J. Seidleck
Assistant Examiner—Gregory Listvoyb
(74) Attorney, Agent, or Firm—Rabin & Berdo, P.C.

(57) ABSTRACT

The present invention provides a series of easily processable poly(ether-imide)s that are organic-soluble and afford low dielectric constants of films, their organic solutions and their manufacturing process. The poly(ether-imide)s is prepared from a dianhydride and a diamine, wherein the diamine is a diamine having tert-butyl group, i.e. 2,6-di-tert-butyl-4-(4-aminopheny)-1-(4-aminophenoxy)benzene the present invention is also direction to synthesis of this special diamine.

5 Claims, No Drawings

LOW DIELECTRIC CONSTANT ORGANO-SOLUBLE POLYIMIDES

BACKGROUND OF THE INVENTION

1. Field of Invention

The present invention relates generally to a series of low dielectric constants and organosoluble polyether imides (PEIs) bearing tert-butyl being prepared from the diamine with various aromatic dianhydrides and more particularly to a novel diamine compound, 2,6-di-tert-butyl-4-(4-aminophenyl)-1-(4-aminophenoxy)benzene, useful in the synthesis of low dielectric constants and organosoluble poly (ether imide)s.

2. Description of Related Art

Thermally stable, durable, insulative polyimides are in great demand for packing integrated circuitry. In electronics packing, these low diectric constant materials are used as passivation layers to minimize crosstalk and to maximize signal propagation speed in devices. Hence, the development of polyimides with increasingly lower dielectric constants has been the focus of several recent investigation.

Aromatic polyimides were well-known as polymeric material of high performance for their excellent thermal stability and balanced mechanical and electronic properties. However, these polymers are difficult to be processed because of high softening temperatures and limited solubility in commercially available solvents; accordingly the research and improvement of their solubility without decreasing their original excellent characteristics were the aims of the present scientists.

SUMMARY OF THE INVENTION

The present invention is directed to a series of polyether imides, that is satisfies low dielectric constants and organosoluble polyether imides. Most of the monomer, aromatic diamine of the aromatic polyimides contains more than two aromatic rings, every two of aromatic rings are linked by an oxygen atom. The present invention provides a simple synthesis method to form a carbon-carbon bond between two aromatic rings of a aromatic diamine.

The invention provides a compound having following formula (I):

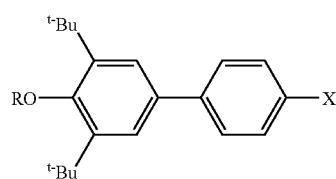

(I)

wherein the R is H, p-nitrophenyl, and p-aminophenyl and X is nitro or amino group. The compound I is synthesized by coupling 1-substituted 2,6-di-tert-butylbenzene with p-substituted halobenzene, such as p-fluoronitrobenzene, p-chloronitrobenzene, p-bromonitrobenzene, p-iodonitrobenzene, or their combinations thereof, in a basic condition and the amino group is reduced from nitro group. For Example, the equivalent ratio of the inorganic base and the 2,6-di-tert-butylphneol may be less than 2 while the R is H and the equivalent ratio of the inorganic base and the 2,6-di-tert-butylphneol may be equal to or more than 2 while the R is p-nitrophenyl. The base used in the reaction can be an inorganic base, such as carbonate salt, hydroxide salt and so on.

The invention also relates to novel diamine compound, 2,6-di-tert-butyl-4-(4-aminophenyl)-1-(4-aminophenoxy) benzene. The diamine is particularly useful as curing agents for epoxy resins and as monomers in the preparation of polyimides. The invention also relates to a series of low dielectric constants and organosoluble poly(ether imide)s (PEIs) bearing tert-butyl being prepared from the diamine with various aromatic dianhydrides and more particularly to a novel diamine compound, 2,6-di-tert-butyl-4-(aminophenyl)-1-(4-aminophenoxy) benzene.

In this present invention, a new diamine, 2,6-di-tert-butyl-4-(4-aminophenyl)-1-(4-aminophenoxy)benzene, is prepared and used in preparation of poly (ether imide)s by carrying put a ring-opening poly-addition reaction with various aromatic dianhydrides to poly(amic acids)s followed by a chemical or thermal cyclodehydration to the PEIs. The new diamine, 2,6-di-tert-butyl-4-(4-aminophenyl)-1-(4-aminophenoxy)benzene, has the following formula (II):

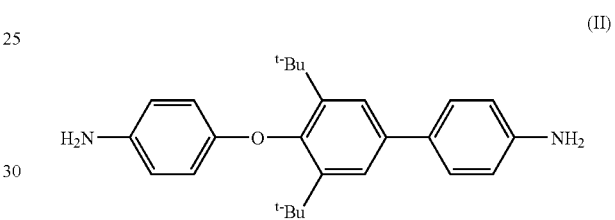

(II)

The organosoluble and low dielectric constants of polyimides were prepared according to the present invention can be represented by the following formula (III):

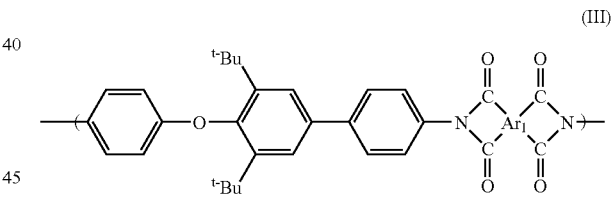

(III)

wherein $Ar_1$ is

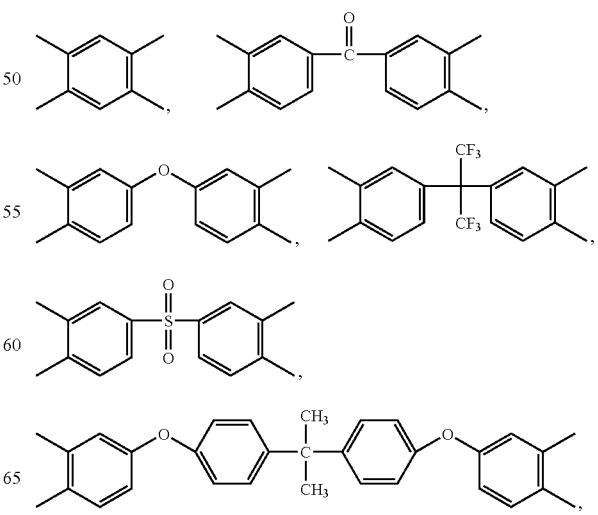

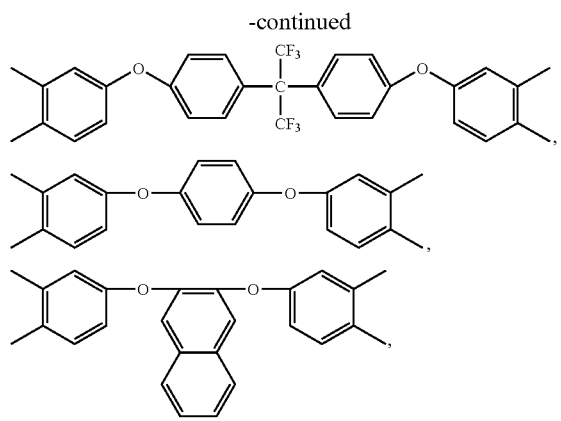
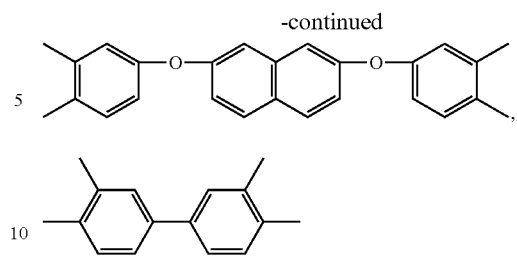
In the preparation of poly(ether imide)s according to the present invention, a different diamine may be used together with the diamine (II) to react with a dianhydride to obtain a poly(ether imide) copolymer (IV), as shown in the following reaction equation (1)
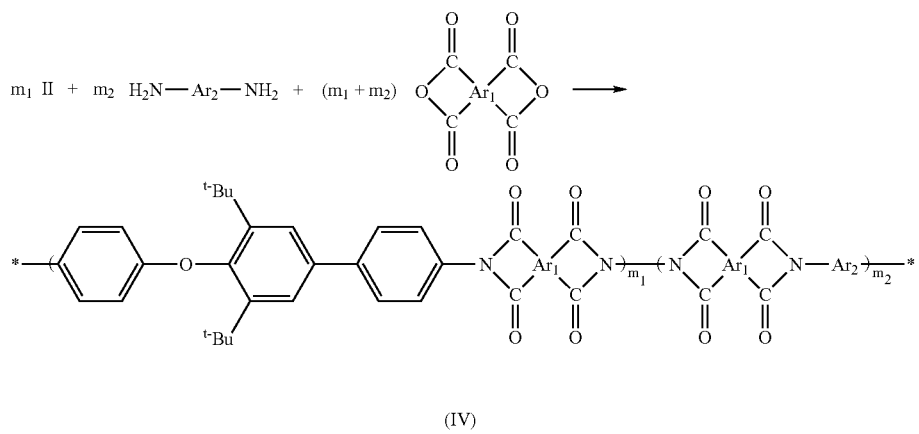
wherein $m_1$ and $m_2$ are integers, $Ar_1$ is defined as above, and $Ar_2$ represents
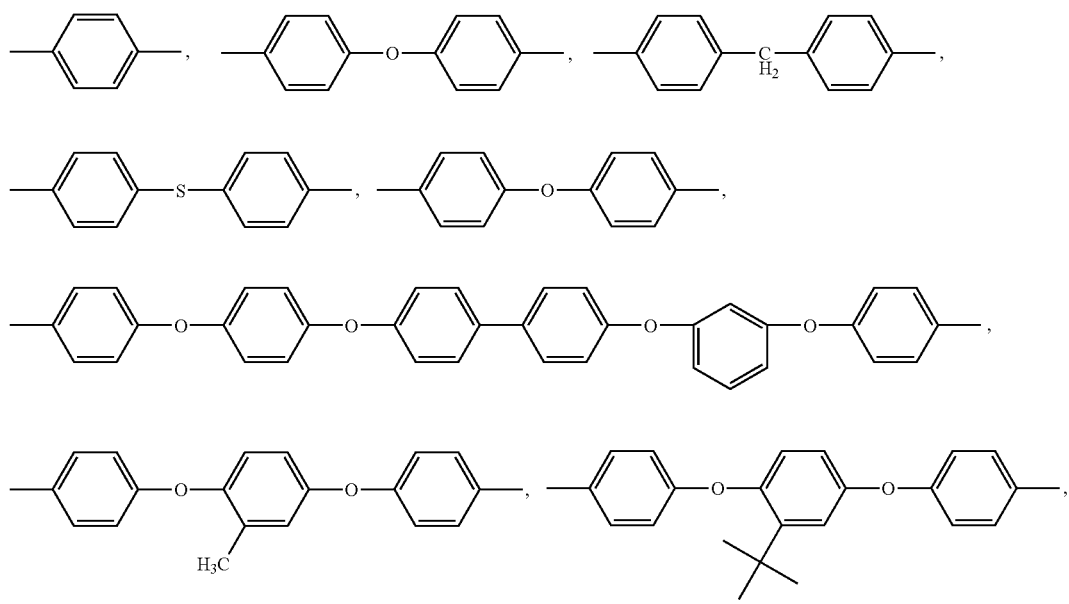

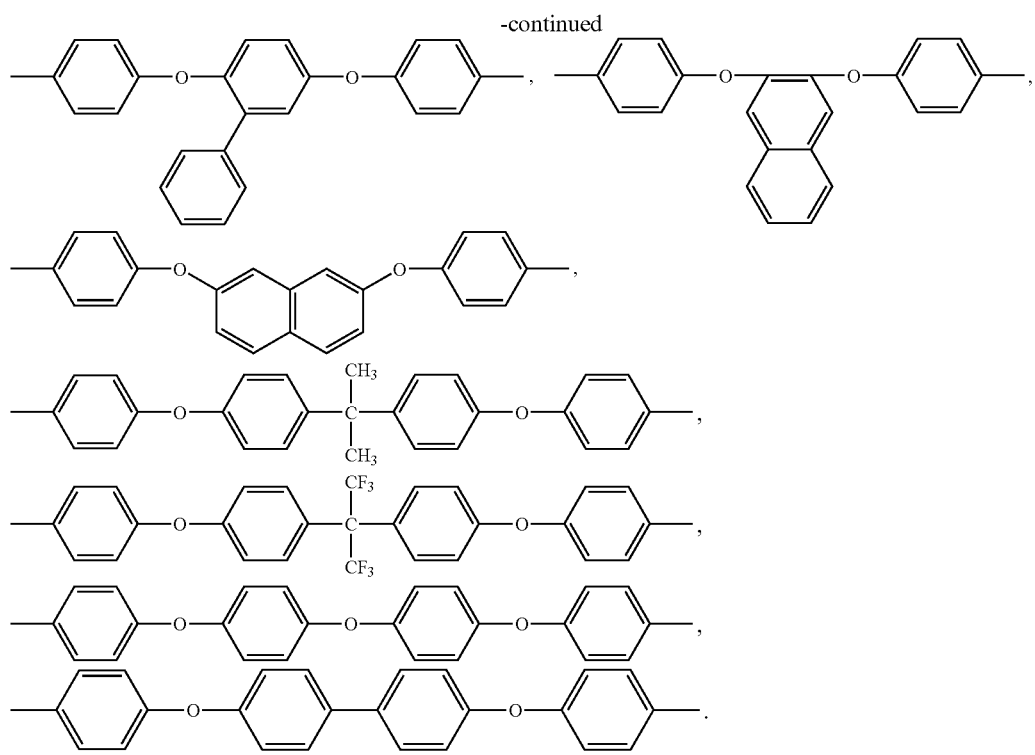

The poly(ether imide) copolymer (IV) further comprises an unit represented by the following formula (III').

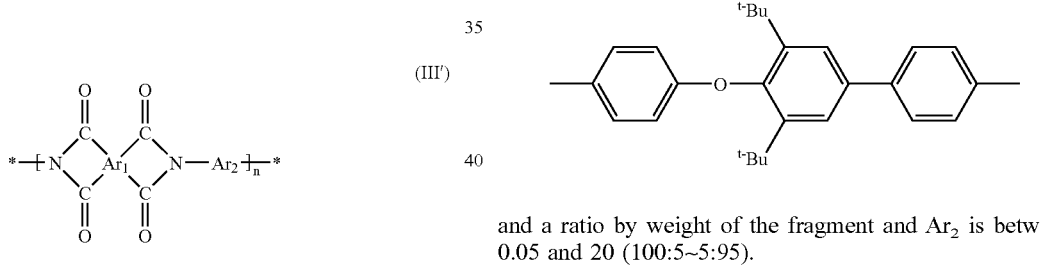

Preferably, the poly(ether imide) copolymer (IV) contains the fragment as following:

and a ratio by weight of the fragment and $Ar_2$ is between 0.05 and 20 (100:5~5:95).

Selectively, a suitable amount of unsaturated monoanhydride could be added to the reaction (1) for preparing a cross-linkable PEIs (V), as shown in the following reaction equation (2).

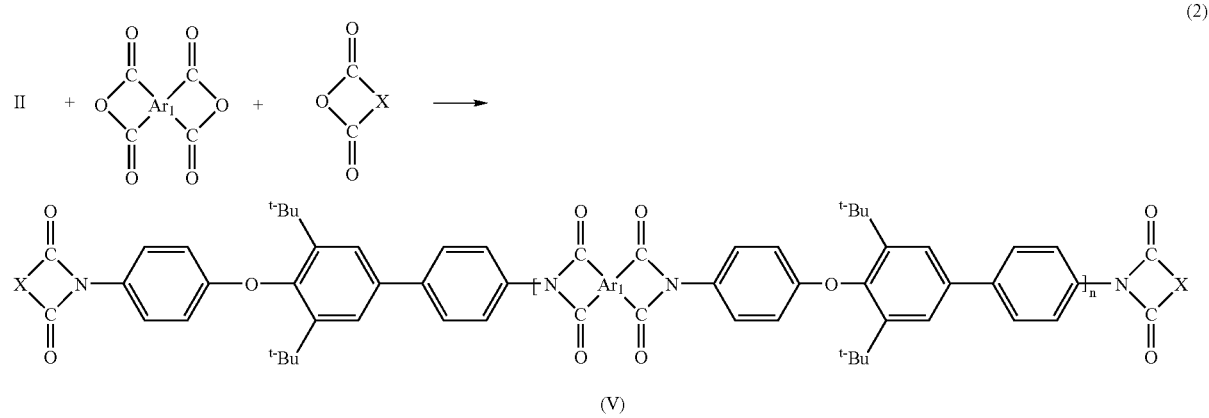

Wherein X:

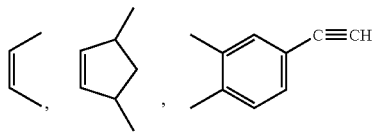

Polyimides and co-polyimides of the present invention can be synthesized from various dianhydrides with various diamines by the conventional two-stage process that includes ring-opening polyaddition to the poly(amic acid)s in an appropriate solvent (such as NMP or DMAc) followed by chemical (additions of acetic anhydride and pyridine (Ac$_2$O/Py)) or thermal cyclodehydration to the co-Polyimides and Polyimides. Polyimides and copolymer can also be prepared from the conventional one-stage process by is heating the two reactants directly in the solvent having high boiling point (such as NMP/o-xylene or m-cresol).

The reactions for preparing Polyimides and co-Polyimides are shown in the following equations:

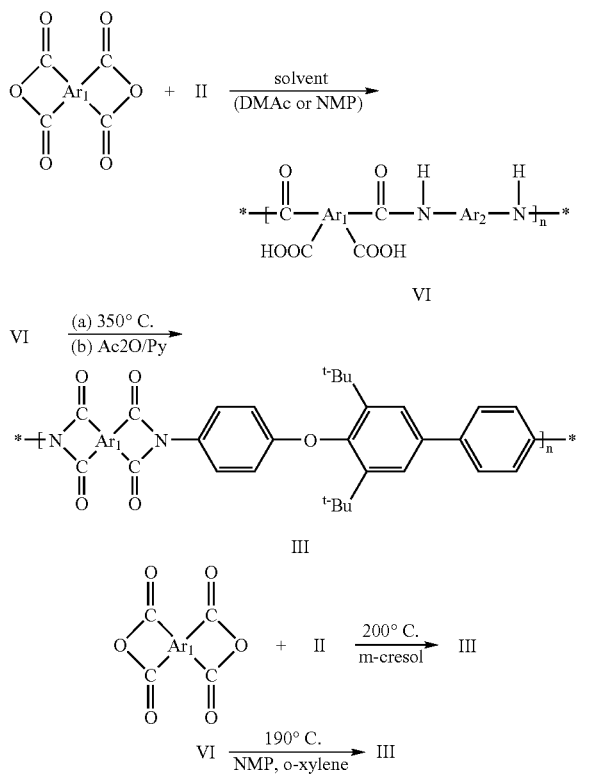

wherein Ar$_1$ are defined as above. The tetracarboxylic dianhydrides with different Ar$_1$ also can be used to react with diamine (II) to form a copolymer. Furthermore, the tetracarboxylic dianhydrides with different Ar$_1$ also can be used to react with diamine (II) and other diamine to form copolymers, too. The present invention will be further illustrated by the following examples, which are not used to merely limit the scope of present invention.

It is to be understood that both the foregoing general description and the following detailed description are by examples, and are intended to provide further explanation of the invention as claimed.

DESCRIPTION OF THE PREFERRED EMBODIMENTS

EXAMPLE 1

Synthesis of
2,6-di-tert-butyl-4-(4-nitrophenyl)phenol 8.40 g (40.7 mmol) 2,6-di-tert-butylphenol was dissolved in 100 ml dried DMSO. 8 g (58 mmol) potassium carbonate and 8.5 g (54 mmol) p-chloronitrobenzene were added into the DMSO solution. The DMSO solution was heated to 100~120° C. for 12 hrs with stirring. Then the reaction mixture was allowed to cool to room temperature and poured into distilled water. The aqueous solution was acidified to pH 2~4 and yellow precipitate was collected by filtration. The yellow precipitate was washed with water and dried. The crude yield was 92%. The yellow precipitate was purified by recrystallizing in cyanomethane, mp 157~160° C. Elemental Anal. Calcd.: C, 73.40; H, 7.64; N, 4.28. Found: C, 73.25; H, 7.58; N, 4.25%.

EXAMPLE 2

Synthesis of
2,6-di-tert-butyl-4-(4-nitrophenyl)phenol 8.40 g (40.7 mmol) 2,6-di-tert-butylphenol was dissolved in 100 ml dried DMSO. 8 g (58 mmol) potassium carbonate and 7.6 g (54 mmol) p-fluoronitrobenzene were added into the DMSO solution. The DMSO solution was heated to 100~120° C. for 12 hrs with stirring. Then the reaction mixture was allowed to cool to room temperature and poured into distilled water. The aqueous solution was acidified to pH 2~4 and yellow precipitate was collected by filtration. The yellow precipitate was washed with water and dried. The crude yield was 75%. The yellow precipitate was purified by recrystallizing in cyanomethane, mp 157~160° C.

EXAMPLE 3

Synthesis of
2,6-di-tert-butyl-4-(4-nitrophenyl)phenol 8.40 g (40.7 mmol) 2,6-di-tert-butylphenol was dissolved in 100 ml dried DMSO. 18.9 g (58 mmol) cesium carbonate and 8.5 g (54 mmol) p-chloronitrobenzene were added into the DMSO solution. The DMSO solution was heated to 100~120° C. for 12 hrs with stirring. Then the reaction mixture was allowed to cool to room temperature and poured into distilled water. The aqueous solution was acidified to pH 2~4 and yellow precipitate was collected by filtration. The yellow precipitate was washed with water and dried. The crude yield was 88%. The yellow precipitate was purified by recrystallizing in cyanomethane, mp 157~160° C.

EXAMPLE 4

Synthesis of 2,6-di-tert-butyl-4-(4-nitrophenyl)phenol 8.40 g (40.7 mmol) 2,6-di-tert-butylphenol was dissolved in 100 ml dried DMSO. 2.32 g (58 mmol) sodium-hydroxide and 8.5 g (54 mmol) p-chloronitrobenzene were added into the DMSO solution. The DMSO solution was heated to 100~120° C. for 12 hrs with stirring. Then the reaction mixture was allowed to cool to room temperature and poured into distilled water. The aqueous solution was acidified to pH 2~4 and yellow precipitate was collected by filtration. The yellow precipitate was washed with water and dried. The crude yield was 85%. The yellow precipitate was purified by recrystallizing in cyanomethane, mp 157~160° C.

EXAMPLE 5

Synthesis of 2,6-di-tert-butyl-4-(4-aminophenyl)-1-(4-aminophenoxy)-benzene 8.40 g (40.7 mmol) 2,6-di-tert-butylphenol was dissolved in 100 ml dried DMSO. 15 g (108.8 mmol) potassium carbonate and 7.14 g (45.4 mmol) p-chloronitrobenzene were then added into the DMSO solution. The DMSO solution was heated to 100~110° C. for 12 hrs with stirring. Then 5.7 g(40.4 mmol) p-fluoronitrobenzene was added into the reaction mixture, and the mixture was reflux for 12 hrs. The reaction mixture was allowed to cool to room temperature and then poured into distilled water. The precipitate was collected by filtration, washed with water, dried and then recrystallized with toluene to yield 10.1 g dinitro compound. Yield: 55.3%. mp 225~227° C. Elemental Anal. Calcd.: C, 69.60; H, 6-25; N, 6.25. Found; C, 69,54; H, 6.21; N, 6.22%.

5.5 g of the obtained dinitro compound [2,6-di-tert-butyl-4-(4-nitrophenyl)-1-(4-nitrophenoxy)benzene], 0.11 g of 10% Pd-C, and 28 ml ethanol were introduced into a three-necked flask to which 12 ml of hydrazine monohydrate ($NH_2NH_2 \cdot H_2O$) was added dropwise at 90° C. After the addition was complete, the mixture was heated until hydrogen disappeared. The mixture was then filtered when it was still hot to remove Pd/C. After cooling, 2,6-di-tert-butyl-4-(4-aminophenyl)-1-(4-aminophenoxy)benzene (I) in the form of colorless needle crystal was collected. Yield: 4.38 g (92%). mp 208~210° C.

Elemental Anal. Calcd.: C, 80.41; H, 8.24; N, 7.21. Found: C, 80.36; H, 8.20; N. 7.18%.

EXAMPLE 6

The 2,6-di-tert-butyl-4-(4-nitrophenyl)-1-(4-nitrophenoxy)benzene was prepared in the same manner as in Example 5 except that 100 ml of N,N-dimethylformamide (DMF) as used as a solvent. Yield of nitro is 37.5%.

Reduction of 2,6-di-tert-butyl-4-(4-nitrophenyl)-1-(4-nitrophenoxy)-benzene with hydrogen 5.5 g of 2,6-di-tert-butyl-4-(4-nitrophenyl)-1-(4-nitrophenoxy)benzene was dissolved in 28 ml of ethanol and then 0.11 g of 10% palladium on carbon (Pd-C) was added. The mixture was vigorously stirred under hydrogen at ordinary pressure at room temperature for 1 day. The mixture was filtered to remove the catalyst (Pd-C), and the ethanol was evaporated under reduced pressure. The yield of 2,6-di-tert-butyl-4-(4-aminophenyl)-1-(4-aminophenoxy)benzene (I) was 46.6 g (95%).

EXAMPLE 7

2,6-di-tert-butyl-4-(4-aminophenyl)-1-(4-aminophenoxy)benzene (diamine II) 1.75 g (4.5 mmol) was dissolved in 12 ml of dried N-methyl-2-pyrrolidone(NMP) in a 25 ml flask. After the diamine was dissolved completely, biphenyl tetracarboxylic dianhydride 1.32 g (4.5 mmol) was added. The mixture was stirred at room temperature for 3 hr and then 3 ml o-xylene was added to the reaction mixture. The temperature was raised to 190° C. slowly, and the reaction mixture was stirred for 8 h at 190° C. In this period time, xylene was periodically removed from the Dean-Stark trap, and dry xylene was added into the reaction to ensure polymerization in progress. The reaction mixture was cooled and poured into distilled water to form a precipitate, which was collected and dried to obtain polyimide product. The polyimide obtained has an inherent viscosity of 0.95 dl/g (NMP, 0.5 g/dl,30° C.) and is soluble in NMP, DMAc, THF and cychohexanone.

EXAMPLE 8

2,6-di-tert-butyl-4-(4-aminophenyl)-1-(4-aminophenoxy)benzene (diamine II) 1.75 g (4.5 mmol) was dissolved in 15 ml m-cresol containing 2% isoquinoline in nitrogen atmosphere in a 25 ml flask. After the diamine was dissolved completely, biphenyl tetracarboxylic dianhydride 1.32 g (4.5 mmol) was added. The reaction mixture was heated at 30° C. for 3 hr with stirring, and then the flask was placed in an oil bath for further heating from 100 to 200° C. within 3 hr and for another 10 hr at 200° C. with stirring. The reaction was cooled and poured into methanol to form a precipitate, which was collected and dried to obtain polyimide product. The polyimide obtained has an inherent viscosity of 1.11 dl/g (NMP, 0.5 g/dl, 30° C.) and is soluble in NMP, DMAc, THF and cyclohexanone. The glass transition temperature (Tg), measured by differential scanning calorimetry (DSC), is 384° C.

EXAMPLES 9 TO 13

Various dianhydrides are reacted with an equivalent amount of 2,6-di-tert-butyl-4-(4-aminophenyl)-1-(4-aminophenoxy)benzene (diamine II) and the product is then cyclized to the polyimide as described in Example 7. The anhydrides and the properties of the resulting polyimides are summarised in Table 1, 2 and 3.

EXAMPLE 14

Copolymer Synthesis 2,6-di-tert-butyl-4-(4-aminophenyl)-1-(4-aminophenoxy)benzene (diamine II) 0.875 g (2.25 mmol) and 4,4'-oxydianiline 0.45 g (2.25 mmol) were dissolved in 15 ml m-cresol containing 2% isoquinoline in nitrogen atmosphere in a 25 ml flask. After the diamine was dissolved completely, 4,4'-oxydiphthalic anhydride 1.4 g (4.5 mmol) was added. The reaction mixture was heated at 30° C. for 3 hr with stirring, and then the flask was placed in an oil bath for further heating from 100 to 200° C. within 3 hr and for another 10 hr at 200° C. with stirring. The reaction was cooled and poured into methanol to form a precipitate, which was collected and dried to obtain polyimide product. The polyimide obtained has an inherent viscosity of 0.78 dl/g (NMP, 0.5 g/dl, 30° C.) and is soluble in NMP, DMAc, THF and cyclohexanone. The dielectric constant is 3.11.

EXAMPLE 15

Copolymer Synthesis 2,6-di-tert-butyl-1(4-aminophenyl)-1-(4-aminophenoxy) benzene (diamine II) 0.875 g (2.25 mmol) and 4,4'-oxydianiline 0.45 g (2.25 mmol) were dissolved in 15 ml m-cresol containing 2% isoquinoline in nitrogen atmosphere in a 25 ml flask. After the diamine was dissolved completely, biphenyl tetracarboxylic dianhydride 1.32 g (4.5 mmol) was added. The reaction mixture was heated at 30° C. for 3 hr with stirring, and then the flask was placed in an oil bath for further heating from 100 to 200° C. within 3 hr and for another 10 hr at 200° C. with stirring. The reaction was cooled and poured into methanol to form a precipitate, which was collected and dried to obtain polyimide product. The polyimide obtained has an inherent viscosity of 0.85 g/dl (NMP, 0.5 dl/g, 30° C.) and is soluble in NMP, DMAc, THF and cyclohexanone. The dielectric constant is 3.12.

EXAMPLE 16

Copolymer Synthesis 2,6-di-tert-butyl-4-(4-aminophenyl)-1-(4-aminophenoxy) benzene (diamine II) 1.75 g (4.5 mmol) was dissolved in 12 ml of dried N-methyl-2-pyrrolidone(NMP) in a 25 ml flask. After the diamine was dissolved completely, 4,4 oxydiphthalic anhydride 0.70 g (2.25 mmol) and 4,4-carbonyldiphthalic anhydride 0.72 g (2.25 mmol) was added. The mixture was stirred at room temperature for 3 hr and then 3 ml o-xylene was added to the reaction mixture. The temperature was raised to 190° C. slowly, and the reaction mixture was stirred for 8 h at 190° C. In this period time, xylene was periodically removed from the Dean-Stark trap, and dry xylene was added into the reaction to ensure polymerization in progress. The reaction mixture was cooled and poured into distilled water to form a precipitate, which was collected and dried to obtain polyimide product. The polyimide obtained has an inherent viscosity of 0.85 dl/g (NMP, 0.5 g/dl,30° C.) and is soluble in NMP, DMAc and THF. The dielectric constant is 3.04.

EXAMPLE 17

Copolymer Synthesis 2,6-di-tert-butyl-4-(4-aminophenyl)-1-(4-aminophenoxy) benzene (diamine II) 0.875 g (2.25 mmol) and 4,4-oxydianiline 0.45 g (2.25 mmol) were dissolved in 12 ml of dried N-methyl-2-pyrrolidone(NMP) in a 25 ml flask. After the diamine was dissolved completely, 4,4-oxydiphthalic anhydride 0.70 g (2.25 mmol) and 4,4 carbonyldiphthalic anhydride 0.72 g (2.25 mmol) were added. The mixture was stirred at room temperature for 3 hr and then 3 ml o-xylene was added to the reaction mixture. The temperature was raised to 190° C. slowly, and the reaction mixture was stirred for 8 h at 190° C. In this period time, xylene was periodically removed from the Dean-Stark trap, and dry xylene was added into the reaction to ensure polymerization in progress. The reaction mixture was cooled and poured into distilled water to form a precipitate, which was collected and dried to obtain polyimide product. The polyimide obtained has an inherent viscosity of 0.92 dl/g (NMP, 0.5 g/dl,30° C.) and is soluble in NMP, DMAc and THF. The dielectric constant is 3.06.

EXAMPLE 18

In order to show the low dielectric constants of the poly(ether imide)s of the present invention, the dielectric constants were measured by the sputter-coated sensor using a dielectric analyzer (TA Instruments DEA 2970) on thin films. Gold electrodes were vacuum deposited on both surfaces of dried films, followed by measuring at 25° C. in a sealed chamber at 0% relative humidity. Table 2 indicates that the dielectric constants of poly(ether imide)s of the present invention are low: ranging form 2.82 to 3.12. A comparison of dielectric constant of poly(ether imide)s with the corresponding polyimide derived from pyromellitic dianhydride and 4,4-oxydianiline shows that poly(ether imide) of the present invention have lower dielectric constants (as shown in Table 2).

TABLE 1

| Example | Dianhydrides | $\eta_{inh}$ (dl/g) | Solubility | | | |
|---|---|---|---|---|---|---|
| | | | NMP | DMAc | THF | cyclohexanone |
| 8 | [structure] | 1.11 | ++ | ++ | ++ | + |
| 9 | [structure] | 1.73[2] | +− | +− | − | − |

TABLE 1-continued

| Example | Dianhydrides | $\eta_{inh}$ (dl/g) | Solubility NMP | DMAc | THF | cyclohexanone |
|---|---|---|---|---|---|---|
| 10 | benzophenone-3,3',4,4'-tetracarboxylic dianhydride (BTDA) | 1.20 | ++ | ++ | ++ | ++ |
| 11 | 4,4'-oxydiphthalic anhydride (ODPA) | 0.97 | ++ | ++ | ++ | ++ |
| 12 | 4,4'-(hexafluoroisopropylidene)diphthalic anhydride (6FDA) | 0.90 | ++ | ++ | ++ | ++ |
| 13 | 3,3',4,4'-diphenylsulfone tetracarboxylic dianhydride (DSDA) | 0.82 | ++ | ++ | − | + |

[1] Measured in NMP on 0.5 g/dl at 30° C.
[2] Measured in o-chlorophenol on 0.5 g/dl at 30° C.
[3] Solubility: ++, soluble at room temperature; +, soluble on heating at 60° C.; +−, partial soluble on heating at 60° C.; −, insoluble on heating at 60° C.

TABLE 2

| Example | strength to break (MPa) | elongation to break (%) | % H₂O absorption[1] | dielectric constant (dry, 1 kHz) |
|---|---|---|---|---|
| 8 | 100 | 18.7 | 1.15 | 3.05 |
| 9 | 58 | 11.5 | 1.48 | 2.95(3.25)[2] |
| 10 | 82 | 5.9 | 1.53 | 3.10 |
| 11 | 88 | 16.0 | 1.49 | 2.98 |
| 12 | 83 | 21.4 | 0.97 | 2.82 |
| 13 | 88 | 4.3 | 1.74 | 3.11 |
| 14 | — | — | — | 3.11 |
| 15 | — | — | — | 3.12 |
| 16 | — | — | — | 3.04 |
| 17 | — | — | — | 3.06 |

[1] The method for measuring moisture absorption of polyimide films was the immersion of the films in water at 25 ± 1° C. for 100 hr, followed immediately by weighting.
[2] A poly(ether imide) was synthesized from 4,4-oxydianiline and pyromellitic dianhydride in our laboratory. The inherent viscosity of its poly(amic acid) precursor was 0.85 dl/g.

TABLE 3

| | | dec Temp. (° C.)[2] | |
|---|---|---|---|
| Example | Tg (° C.)[1] | Air | N₂ |
| 5 | 384 | 505 | 502 |
| 6 | 395 | 490 | 491 |
| 7 | 337 | 495 | 494 |
| 8 | 337 | 495 | 499 |
| 9 | 346 | 490 | 496 |
| 10 | 344 | 462 | 454 |

[1] Glass transition temperature (Tg) measured by DSC at a heating rate of 20° C./min in nitrogen.
[2] Temperature at which 10% weight loss recorded by TG at a heating rare of 10° C./min.

As can be seen from Tables 1-3, poly(ether imide)s of the present invention are successfully synthesized from 2,6-di-tert-butyl-4-(4-aminophenyl)-1-(4-aminophenoxy)benzene (I) with various aromatic dianhydrides with inherent viscosities of 0.82~1.73 dl/g. Almost all of the polyimides are highly soluble in solvents such as DMAc, NMP, THF and cyclohexanone. The solution cast films of these polymers from NMP solution formed tough and flexible films, with tensile strengths of 58~100 MPa, and elongations to break of 5.9~21.4%. The glass transition temperature (Tg) of these polymers are observed to be in the range of 337~395° C. The temperature at 10% weight loss of the polyimides are above 450° C. on the TG curves. In addition, films of these polyimides have low dielectric constants, ranging from 2.82 to 3.12, and low moisture absorptions less than 1.74%. Thus, the novel polyimides derived from 2,6-di-tert-butyl-4-(4-aminophenyl)-1-(4-aminophenoxy)benzene (II) are highly promising for electronic applications owing to their excellent physical properties.

Reference will now be made in detail to the present preferred embodiments of the invention, examples of which are illustrated in the accompanying drawings. Wherever possible, the same reference numbers are used in the drawings and the description to refer to the same or like parts.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A compound of formula (I) for transferring to an aromatic diamine which is used for synthesizing organosoluble poly(ether imide)s having a high glass transition temperature and a low dielectric constant

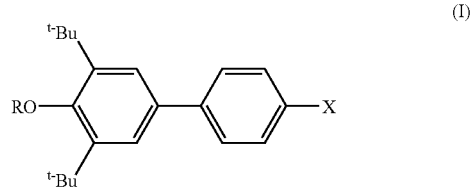

(I)

wherein R is one of a p-nitrophenyl group or a p-aminophenyl group, and X is one of a nitro group or an amino group.

2. An organosoluble poly(ether imide) poly(ether imide) having a high glass transition temperature and a low dielectric constant, comprising units represented by formula(III) as follows

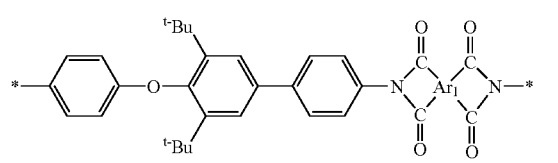

(III)

wherein Ar₁ is selected from the group consisting essentially of

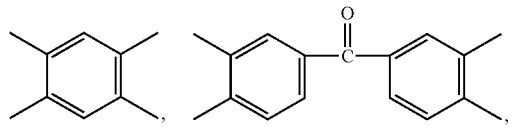

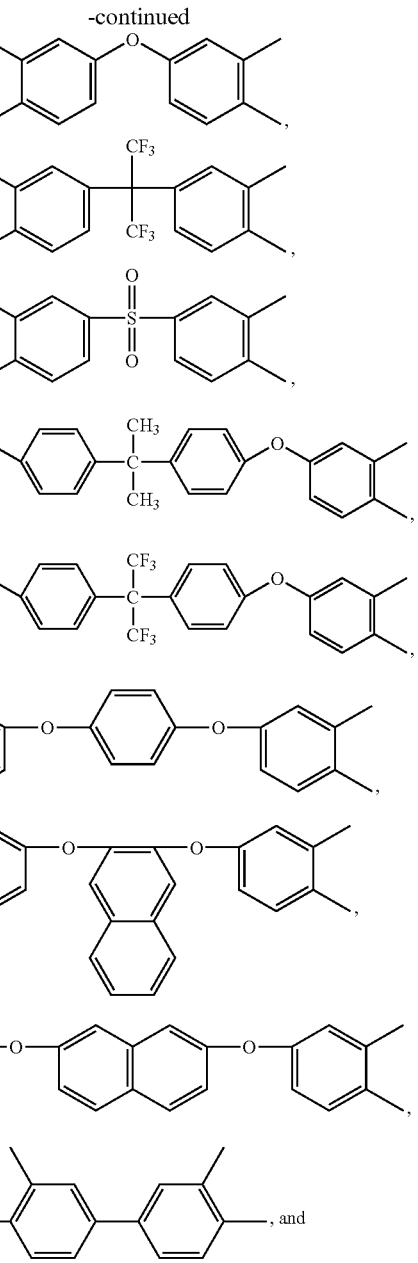

combinations thereof.

3. The poly(ether imide) according to claim 2, further comprising units represented by formula (III') which follows, wherein said units (III) and (III') are random

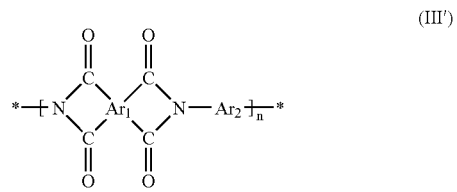

(III')

and wherein Ar₁ is defined as in formula (III), and Ar₂ is selected from the group consisting essentially of

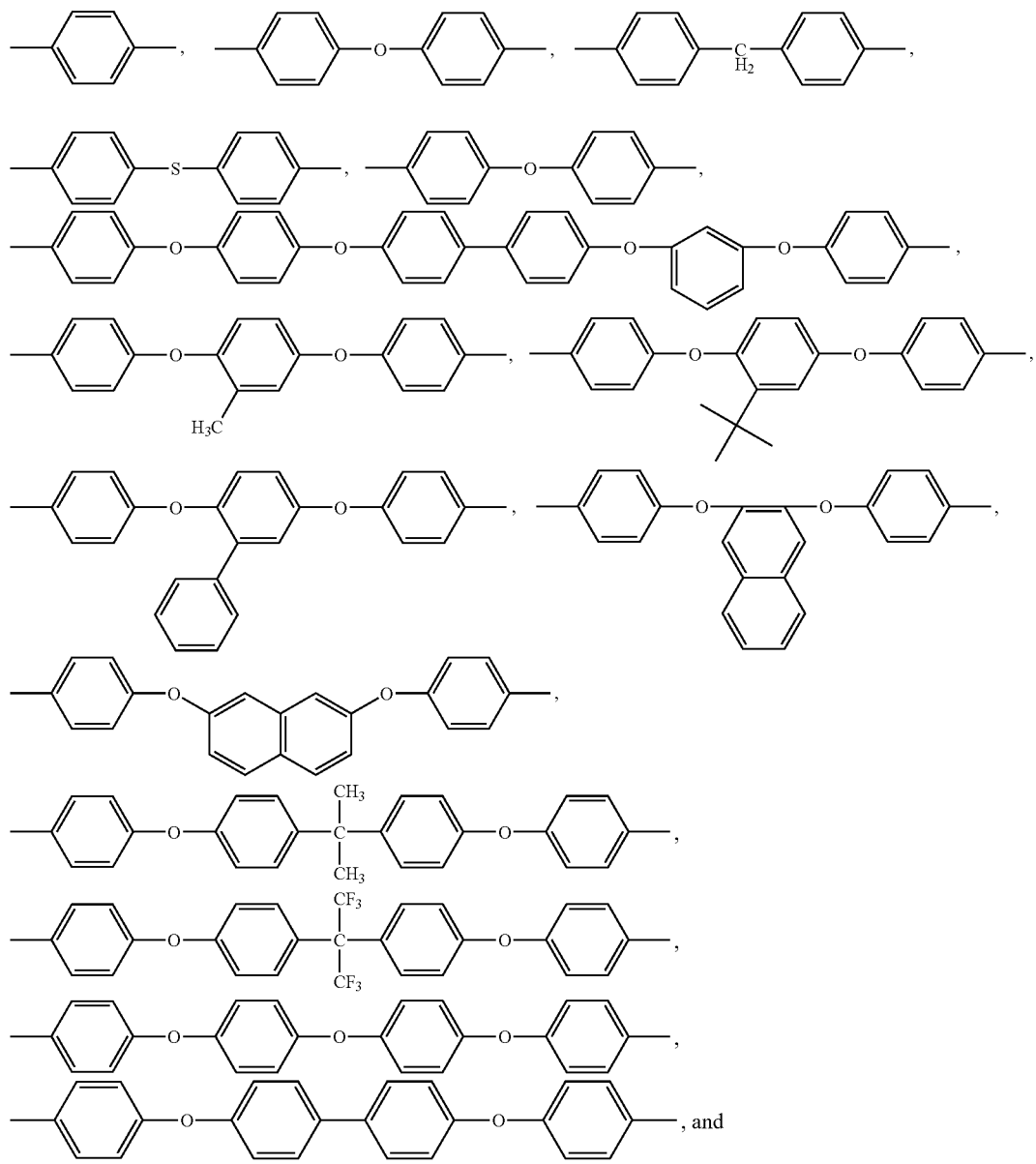

combinations thereof.

4. The poly(ether imide) according to claim 3, wherein a ratio by weight of a fragment of

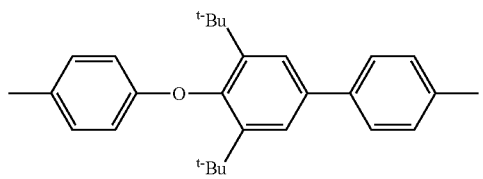

and $Ar_2$ ranges between 0.05 and 20.

5. The poly(ether imide) according to claim 3, wherein the polymer can dissolve in an organic solvent selected from the group consisting essentially of N-methyl-2-pyrrolidon (NMP), N,N-dimethylacetamide (DMAc), tetrahydrofuran (THF) and cyclohexanone.

* * * * *